(12) United States Patent
Jansen et al.

(10) Patent No.: US 6,241,954 B1
(45) Date of Patent: Jun. 5, 2001

(54) CRYSTALLIZATION METHOD AND INSTALLATION

(75) Inventors: Halbe Anne Jansen, Maren-Kessel; Johannes Josephus Andreas Gerardus Jansen, Bergeijk, both of (NL)

(73) Assignee: Niro Process Technology B.V. (NL)

( * ) Notice: Subject to any disclaimer, the term of this patent is extended or adjusted under 35 U.S.C. 154(b) by 0 days.

(21) Appl. No.: 09/287,039

(22) Filed: Apr. 6, 1999

(30) Foreign Application Priority Data

Apr. 6, 1998 (NL) .................................................. 1008812

(51) Int. Cl.[7] .......................................................... B01D 7/00
(52) U.S. Cl. ......................................... 422/245.1; 422/254
(58) Field of Search ................................ 422/245.1, 251, 422/253, 254

(56) References Cited

U.S. PATENT DOCUMENTS 2,910,516 * 10/1959 Rush ....................................... 62/538

FOREIGN PATENT DOCUMENTS

| | | |
|---|---|---|
| 2048657 | 4/1972 | (DE) . |
| 4135245 | 6/1992 | (DE) . |
| 8104086 | 4/1983 | (NL) . |

OTHER PUBLICATIONS

European Search report dated Dec. 15, 1998, for Netherlands Patent Application No. 1008812.

* cited by examiner

Primary Examiner—Benjamin L. Utech
Assistant Examiner—Kin-Chan Chen
(74) Attorney, Agent, or Firm—Handal & Morofsky

(57) ABSTRACT

The present invention relates to a method and installation for the crystallisation of a liquid from a solution, a suspension or a mixture of liquids using a crystalliser 2 which, for example, is provided on its wall with a heat exchanger 4 and comprises a single chamber for both nucleation and growth. Depleted mother liquor is withdrawn from the crysiallisation vessel via a filter 10 located in the crystalliser, so that the crystal content in the vessel can be accurately adjusted for the purpose of optimum separation of the crystals, preferably using a packed-bed wash column. The crystalliser preferably contains a stirrer with the filter on the stirrer 5 shaft. The filter rotates past a scraper 12, which is arranged in a fixed position, as a result of which the filter cake can be reintroduced into the suspension without damage to the crystals.

18 Claims, 1 Drawing Sheet

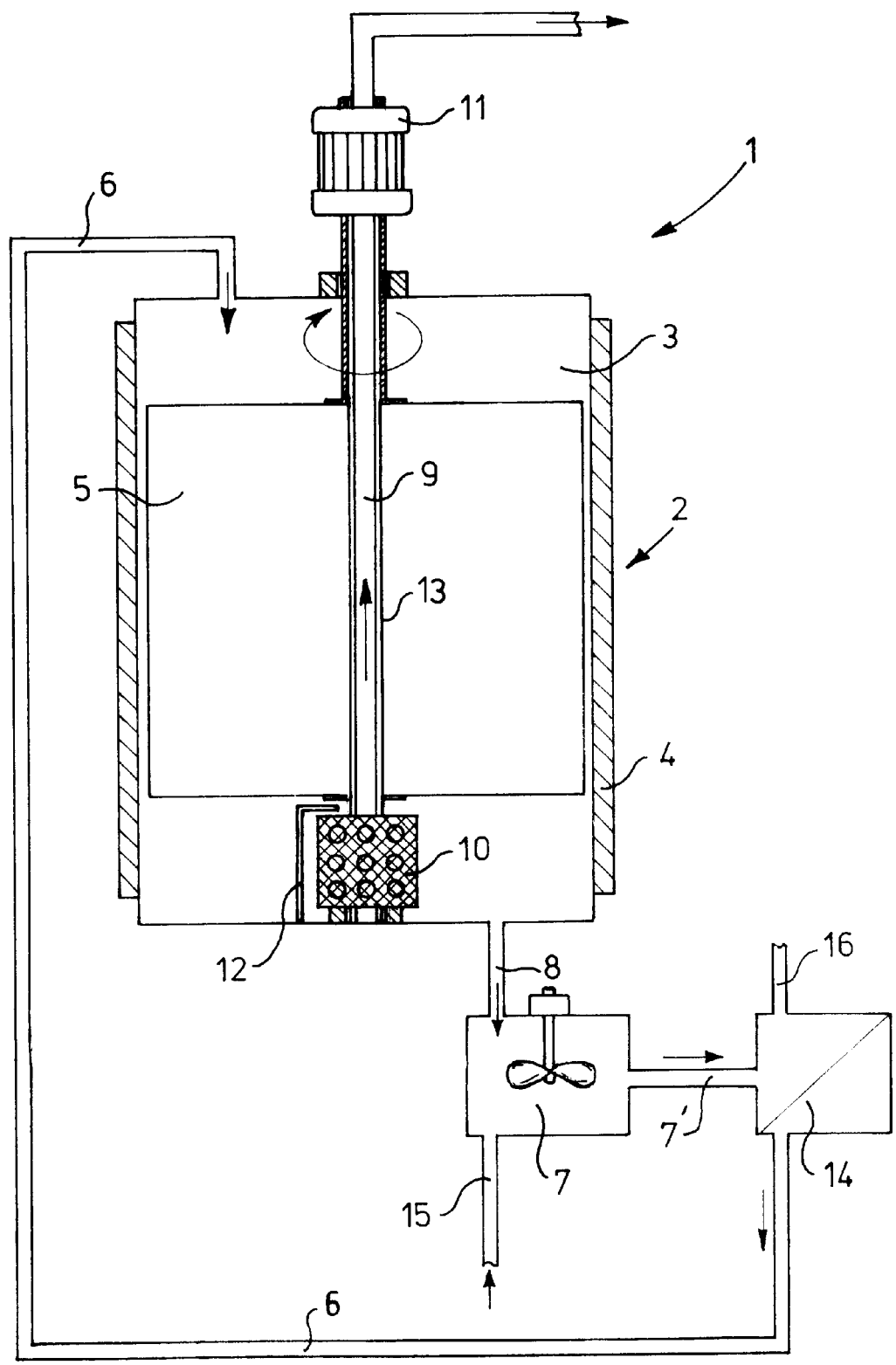

CRYSTALLIZATION METHOD AND INSTALLATION

The present invention relates to a method for the crystallisation of a liquid from a mother liquor comprising a solution, a suspension or a mixture of liquids, comprising the following steps:

feeding the mother liquor to a zone to form a crystal slurry discharge of the crystal slurry from the zone via a crystal slurry discharge line and feeding said slurry to a separator.

The invention also relates to an installation for the crystallisation of a liquid from a solution, a suspension or a mixture of liquids, comprising:

a crystalliser connected to a feed line for feeding the solution, the suspension or the mixture, comprising a vessel having a cooling element for the purpose of forming crystals in the vessel, a filter located in the vessel, which filter is connected to a discharge line for liquid filtered from the vessel, and a crystal slurry discharge line, connected to the vessel, for discharging a suspension of crystals from the vessel.

Netherlands ter inzage legging (laid open application) no. 8104086, in the name of the Applicant, discloses a recrystallisation vessel in which a scraped-surface heat exchanger is accommodated inside the vessel. The scraped-surface heat exchanger constitutes a separate nucleation zone for the crystals, with an average retention time of the mother liquor of between approximately 10 and 100 seconds. Following nucleation, the ice crystals are fed from the heat exchanger to the maturing vessel, where the average retention time is of the order of several hours. One or more combined screening/washing devices, such as a wash column, are mounted on the vessel to separate the crystals formed form the mother liquor. A stirrer and a filter, set up in a fixed position, are also fitted in the vessel. The mother liquor is withdrawn from the vessel through the filter and recycled via a pump to the feed for the heat exchanger. The depleted mother liquor which, via the filter, has been removed from the vessel can also be withdrawn from the circuit through a discharge line. A disadvantage of such an installation is that, as a consequence of the separate nucleation and growth of the crystals and the resultant differences in retention time in the respective separate nucleation and maturing zones, the filter has to cope with large volume flows and is a critical element in this set-up.

To achieve efficient separation of the crystals from the mother liquor using a wash column, the mother liquor in the recrystallisation installation must not be too viscous and the difference between the melting point of the crystallised substance and the equilibrium temperature of the mother liquor must not be too great. Both increase as the content of the substance to be recovered decreases. If there is too great a difference in melting point, the separation of the crystals from the concentrated mother liquor by means of packed-bed wash columns can no longer take place efficiently. Furthermore, the crystals formed must be as spherical as possible with a suitable size of about 300 $\mu$m and the size distribution must be uniform. If the pure substance to be recovered is water, a very good result is obtained with separate nucleation and growth, as is described, for example, in Netherlands Patent Application no. 8104086 in the name of the Applicant, the disclosure of which is hereby incorporated herein by reference thereto.

However, such a system is less suitable for the majority of other products coming under consideration, because, as a result of their shape, the crystals formed in the nucleation zone do not melt sufficiently rapidly in the maturing vessel. If these crystals do not melt in the maturing vessel, the average crystal size becomes much smaller, which has a severe restrictive effect on the capacity of the crystal mother liquor separator, such as a wash column.

In practice, crystallisation installations in which a distinction is no longer made between nucleation and growth zones is used for these other products. In these installations it is not the mother liquor but the crystal slurry that is passed over a scraped heat-exchanging surface. In some embodiments said surface is incorporated in the vessel and in other embodiments the crystal slurry is fed over one or more external scraped-surface heat exchangers.

Both embodiments have the disadvantage that it is not possible to adjust the crystal content in the vessel independently of the freezing point line in the phase diagram for the product. With installations of this type one is therefore forced to operate with a crystal content far removed from that desirable from the standpoint of process technology. Filter installations located outside the vessel are indeed used, but this has the major disadvantage that some of the crystals break, which again results in a small average crystal size.

One aim of the present invention is to provide a method and an installation for separating solutions, mixtures of liquids or suspensions with crystallisation of the solvent, with which better control of the crystal content in the crystalliser is possible and an appreciable improvement in the capacity can be achieved.

To this end the method according to the present invention is characterised in that the zone is a zone of combined nucleation and growth, mother liquor being withdrawn via a discharge line from the zone via a filter located in the zone.

The installation according to the present invention is characterised in that the cooling element is equipped to cool the entire contents of the vessel, the vessel forming a single chamber for both nucleation and growth of the crystals.

The combination of the filter device in the vessel as known to the Applicant from the separate nucleation and growth systems with the combined nucleation as described above leads to unexpectedly good results. The possibility of operating crystallisation installations at crystal contents optimum from the process technology standpoint appreciably increases the capacity of existing installations and reduces the investment costs for new installations.

Because nucleation and growth according to the present invention take place in a single vessel, it is no longer necessary to recycle large volume flows through the vessel via the filter as according to the prior art. With the installation according to the present invention, a relatively small quantity of depleted mother liquor can be withdrawn from the vessel via the discharge line, as a result of which the crystal content in the combined nucleation and growth zone can be controlled.

No more than 30%, preferably no more than 10%, of the volume of the vessel is discharged per hour via the discharge line from the installation according to the present invention, which discharge line preferably is not directed back to the crystalliser vessel. In contrast to the recirculation stream from the known installation, where, for example, at least twice the capacity of the maturing vessel is recycled per hour through the nucleation zone (and thus also through the filter), the quantity of mother liquor discharged via the filter in the installation according to the invention is relatively small. Consequently, damage to the crystals on the filter is minimised.

Preferably, the crystal slurry discharge line from the installation according to the present invention is connected to a mixing vessel that is also connected to a feed line for supplying the mother liquor from a reservoir to the mixing vessel. In the mixing vessel the crystals are mixed with the mother liquor before being separated off. By this means the viscosity of the crystal slurry is reduced and the freezing point raised, so that the capacity of the wash column increases, Because the crystal slurry in the mixing vessel is mixed with fresh mother liquor the solution separated off from the wash column is still relatively rich in substance to be separated off and this liquor is therefore not discharged but is recycled to the crystalliser via the feed line.

In a further embodiment of an installation according to the present invention, the crystalliser has a stirrer with the filter on the stirrer shaft which filter is rotatable past a stationary scraper. As a result of the internal, rotary filter the mother liquor can be withdrawn from the crystallisation vessel without the crystals becoming damaged. With this set-up the filter cake remains relatively small so that it can be mixed with the crystals present in the vessel without adverse consequences.

In one embodiment the cooling element is positioned along the wall of the crystallisation vessel. With this set-up the stirrer, the rotary filter and the scraper for removing crystals from the wall can be constructed as an integral unit.

One embodiment of the installation for the crystallisation of a liquid according to the present invention will be described in more detail below with reference to the appended single figure.

The figure shows an installation 1 according to the present invention which is provided with a crystalliser 2 comprising a vessel 3 that is provided on the outside with a cooling element 4. A rotary stirrer/scraper 5 is present in the vessel, which stirrer-scraper scrapes off crystals forming on the wall and mixes these to produce a homogeneous suspension. A feed line 6 for the mother liquor is connected at one end to the vessel 3 and at the other end to a separator 14. The contents of the crystallisation vessel 3 are fed via a crystal discharge line 8 to a mixing vessel 7, The mixing vessel 7 is connected via a discharge 7' to the separator 14, such as a packed-bed wash column. A feed line 15 opens into the mixing vessel 7 to supply fresh mother liquor to the mixing vessel from a reservoir. Pure crystals (in suspension or in melted state) are discharged via a discharge 16 from the wash column 14. The depleted mother liquor is recycled from the wash column 14 through the feed line 6 to the vessel 3 of the crystalliser.

The stirrer 5 in the vessel 3 is provided with a stirrer shaft 13, on the end of which a filter 10 is mounted, The discharge line 9 for discharge of depleted mother liquor from the vessel 3, via the filter 10, is connected to the filter 10 and runs through the stirrer shaft 13. The stirrer shaft 13 together with the filter 10 is driven by a motor 11 mounted on the vessel 2 so that they rotate. The filter 10 is rotated past a scraper 12, arranged in a fixed position, to remove the filter cake.

Because the crystal slurry in the mixing vessel 7 is mixed with mother liquor freshly supplied via the feed line 15, the viscosity and concentration are optimised for separation of the crystals with the aid of the packed-bed wash column 14. Because, as a result of this mixing, the mother liquor issuing from the wash column 14 is still rich in substances to be separated off, said mother liquor is fed via the feed line 6 to the crystalliser 2. The most depleted mother liquor in the crystalliser is between the crystals on the filter 10 and is withdrawn from there via the discharge line 9 and discharged from the process. Said discharge of relatively small volumes via the filter 10 results in very little disturbance to the conditions inside the crystalliser, with the result that crystal formation in the latter is not disturbed and crystals of the desired size, of the desired spherical shape and of a uniform size distribution can be formed, which crystals have optimum suitability for separating off in a packed-bed wash column 14.

What is claimed is:

1. An apparatus for the crystallization of a liquid from a solution, a suspension or a mixture of liquids, comprising:
    a) a crystallizer vessel comprising an inlet receiving the solution, the suspension or the mixture of liquids, a chamber for crystal nucleation and growth, a cooling element, a filter being connected with a first discharge outlet whereby a filtered liquid is discharged from the crystallizer vessel, and a second discharge outlet whereby a crystal slurry is discharged from the crystallizer vessel; and
    b) a mixing vessel having a first inlet receiving the crystal slurry discharged from the crystallizer vessel, a second inlet receiving the solution, the suspension or the mixture of liquids and an outlet whereby a mixed product is discharged.

2. An apparatus as in claim 1 further comprising a separator whereby crystals may be separated from solution, said separator having an inlet receiving said mixed product from the mixer vessel and an outlet whereby separated-off solution is supplied to the crystallizer vessel inlet.

3. An apparatus as in claim 2, wherein said separator comprises a wash column.

4. An apparatus as in claim 1, wherein said filtered liquid discharged from said first discharge outlet is not directed back to the crystallizer vessel.

5. An apparatus as in claim 1, wherein said first discharge outlet discharges less than 30% of the volume of the vessel per hour.

6. An apparatus as in claim 1, wherein said first discharge outlet discharges less than 10% of the volume of the vessel per hour.

7. An apparatus as in claim 1, wherein said cystallizer vessel further comprises a stirring device.

8. An apparatus as in claim 7, wherein said stirring device comprises a rotating shaft.

9. An apparatus as in claim 8, wherein said filter is disposed on and rotated by said shaft.

10. An apparatus as in claim 9, wherein said crystallizer vessel further comprises a scraping member disposed so that said filter contacts the scraping member while rotating.

11. An apparatus as in claim 10, wherein said shaft is hollow and comprises the first discharge outlet.

12. An apparatus as in claim 1, wherein said cooling element is disposed on at least a portion of said crystallizer vessel walls.

13. An apparatus as in claim 1, wherein said crystallizer vessel further comprises a scraping device for removing crystals from the interior surface of the walls of said crystallizer vessel.

14. An apparatus as in claim 1, further comprising a scraped-surface heat exchanger coupled externally with said crystallizer vessel.

15. A crystallizer comprising a vessel having a chamber for nucleation and growth of crystals, a cooling element capable of cooling the entire contents of the vessel, a filter connected to a first discharge line for discharging filtered liquid from the vessel, a second discharge line for discharging a suspension of crystals from the vessel, a stirring device having a stirrer shaft, said filter being disposed at the end of the stirrer shaft, and a scraping member, said scraping member being positioned to contact said filter.

16. A crystallizer as in claim 15, wherein said stirrer shaft is hollow and comprises the first discharge line.

17. A crystallizer as in claim 15, wherein said cooling element is disposed on at least a portion of the vessel wall.

18. An apparatus for the crystallization of a liquid from a solution, a suspension or a mixture of liquids, comprising a vessel comprising:

a) an inlet whereby the solution, the suspension or the mixture of liquids is received;

b) a chamber for crystal nucleation and growth;

c) a cooling element;

d) a stirring device having a rotatable shaft;

e) a filter disposed on said shaft and connected with a first discharge outlet, whereby a filtered liquid is discharged from the crystallizer vessel;

f) a scraping member positioned to contact said filter; and g) a second discharge outlet, whereby a crystal slurry is discharged from the crystallizer vessel.

* * * * *